(12) United States Patent
Klemets et al.

(10) Patent No.: US 7,640,352 B2
(45) Date of Patent: Dec. 29, 2009

(54) METHODS AND SYSTEMS FOR PRESENTATION OF MEDIA OBTAINED FROM A MEDIA STREAM

(75) Inventors: Anders E. Klemets, Redmond, WA (US); James C. Stewart, Woodinville, WA (US); Geqiang Zhang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1140 days.

(21) Appl. No.: 10/948,999

(22) Filed: Sep. 24, 2004

(65) Prior Publication Data

US 2006/0075446 A1 Apr. 6, 2006

(51) Int. Cl.
*G06F 15/16* (2006.01)
(52) U.S. Cl. .................. 709/231; 709/203; 709/204; 709/217; 709/228; 725/87
(58) Field of Classification Search .................. 709/203, 709/204, 217, 228, 231; 725/87
See application file for complete search history.

(56) References Cited

U.S. PATENT DOCUMENTS

| | | | |
|---|---|---|---|
| 5,461,415 A | 10/1995 | Wolf et al. | |
| 5,473,362 A | 12/1995 | Fitzgerald et al. | |
| 5,583,868 A | 12/1996 | Rashid et al. | |
| 5,631,694 A | 5/1997 | Aggarwal et al. | |
| 5,699,362 A | 12/1997 | Makam | |
| 5,724,646 A | 3/1998 | Ganek et al. | |
| 5,732,217 A | 3/1998 | Emura | |
| 5,822,537 A | 10/1998 | Katseff et al. | |
| 5,884,141 A | 3/1999 | Inoue et al. | |
| 5,892,915 A | 4/1999 | Duso et al. | |
| 5,926,230 A | 7/1999 | Niijima et al. | |
| 5,936,659 A | 8/1999 | Viswanathan et al. | |
| 5,963,202 A | 10/1999 | Polish | |
| 6,047,317 A | 4/2000 | Bisdikian et al. | |
| 6,078,594 A | 6/2000 | Anderson et al. | |
| 6,118,498 A | 9/2000 | Reitmeier | |
| 6,138,147 A | 10/2000 | Weaver et al. | |
| 6,222,482 B1 | 4/2001 | Gueziec | |
| 6,222,886 B1 | 4/2001 | Yogeshwar | |

(Continued)

FOREIGN PATENT DOCUMENTS

CA 2480461 10/2003

(Continued)

OTHER PUBLICATIONS

Armitage, "Support for Multicast over UNI 3.0/3.1 based ATM Networks", RFC 2022, Standards Track, Nov. 1996, pp. 1-82.

(Continued)

*Primary Examiner*—Vivek Srivastava
*Assistant Examiner*—Adnan Mirza
(74) *Attorney, Agent, or Firm*—Lee & Hayes, PLLC

(57) ABSTRACT

An implementation, as described herein, facilitates fast start-up of a new media stream while mitigating and in some implementations, avoiding temporal interruption (i.e., "stutter") of the presentation of that new media stream. At least one implementation, described herein, measures a rate at which a multimedia stream is received at a downstream component configured to present the multimedia to a user; and, ascertains a duration of time to buffer the received multimedia before presentation thereof, at least in part utilizing the measured rate.

43 Claims, 4 Drawing Sheets

U.S. PATENT DOCUMENTS

| | | |
|---|---|---|
| 6,266,817 B1 | 7/2001 | Chaddha |
| 6,330,286 B1 | 12/2001 | Lyons et al. |
| 6,418,473 B1 | 7/2002 | St. Maurice et al. |
| 6,430,547 B1 | 8/2002 | Busche et al. |
| 6,496,814 B1 | 12/2002 | Busche |
| 6,505,106 B1 | 1/2003 | Lawrence et al. |
| 6,564,262 B1 | 5/2003 | Chaddha |
| 6,580,754 B1 | 6/2003 | Wan et al. |
| 6,609,149 B1 | 8/2003 | Bandera et al. |
| 6,615,133 B2 | 9/2003 | Boies et al. |
| 6,637,031 B1 | 10/2003 | Chou |
| 6,721,952 B1 | 4/2004 | Guedalia et al. |
| 6,728,965 B1 | 4/2004 | Mao |
| 6,738,980 B2 | 5/2004 | Lin et al. |
| 6,751,129 B1 | 6/2004 | Gongwer |
| 6,751,626 B2 | 6/2004 | Brown et al. |
| 6,766,245 B2 | 7/2004 | Padmanabhan |
| 6,842,724 B1 | 1/2005 | Lou et al. |
| 6,856,759 B1 | 2/2005 | Fukuda et al. |
| 6,898,246 B2 | 5/2005 | Katayama |
| 7,051,170 B2 | 5/2006 | Guo |
| 7,106,749 B1 | 9/2006 | Darshan et al. |
| 7,158,531 B2 | 1/2007 | Barton |
| 7,219,145 B2 * | 5/2007 | Chmaytelli et al. ......... 709/224 |
| 7,334,044 B1 | 2/2008 | Allen |
| 2002/0024956 A1 | 2/2002 | Keller-Tuberg |
| 2002/0002708 A1 | 3/2002 | Chadda |
| 2002/0031144 A1 | 3/2002 | Barton |
| 2002/0040481 A1 | 4/2002 | Okada et al. |
| 2002/0107968 A1 | 8/2002 | Horn et al. |
| 2002/0108119 A1 | 8/2002 | Mao et al. |
| 2002/0114331 A1 | 8/2002 | Cheung et al. |
| 2002/0124258 A1 | 9/2002 | Fritsch |
| 2002/0144276 A1 | 10/2002 | Radford et al. |
| 2002/0147979 A1 | 10/2002 | Corson |
| 2002/0147991 A1 | 10/2002 | Furlan et al. |
| 2002/0170067 A1 | 11/2002 | Norstrom et al. |
| 2003/0037331 A1 | 2/2003 | Lee |
| 2003/0060196 A1 | 3/2003 | Levinberg |
| 2003/0093801 A1 | 5/2003 | Lin et al. |
| 2003/0106053 A1 | 6/2003 | Sih et al. |
| 2003/0158899 A1 | 8/2003 | Hughes |
| 2003/0159143 A1 | 8/2003 | Chan |
| 2003/0202594 A1 | 10/2003 | Lainema |
| 2003/0202775 A1 | 10/2003 | Junkersfeld et al. |
| 2004/0003399 A1 | 1/2004 | Cooper |
| 2004/0034863 A1 | 2/2004 | Barrett et al. |
| 2004/0034864 A1 | 2/2004 | Barrett et al. |
| 2004/0049793 A1 | 3/2004 | Chou |
| 2004/0128694 A1 | 7/2004 | Bantz et al. |
| 2004/0160971 A1 | 8/2004 | Krause et al. |
| 2004/0160974 A1 | 8/2004 | Read et al. |
| 2004/0255328 A1 | 12/2004 | Baldwin et al. |
| 2005/0039214 A1 | 2/2005 | Lorenz et al. |
| 2005/0071496 A1 | 3/2005 | Singal et al. |
| 2005/0078680 A1 | 4/2005 | Barrett et al. |
| 2005/0078757 A1 | 4/2005 | Nohrden |
| 2005/0080904 A1 | 4/2005 | Green |
| 2005/0081243 A1 | 4/2005 | Barrett et al. |
| 2005/0081244 A1 | 4/2005 | Barrett et al. |
| 2005/0081246 A1 | 4/2005 | Barrett et al. |
| 2005/0128951 A1 | 6/2005 | Chawla et al. |
| 2005/0154917 A1 | 7/2005 | deCarmo |
| 2005/0172314 A1 | 8/2005 | Krakora et al. |
| 2005/0190781 A1 | 9/2005 | Green et al. |
| 2005/0240961 A1 | 10/2005 | Jerding et al. |
| 2006/0117343 A1 | 6/2006 | Novak et al. |
| 2006/0126667 A1 | 6/2006 | Smith et al. |
| 2006/0251082 A1 | 11/2006 | Grossman et al. |
| 2007/0113261 A1 | 5/2007 | Roman et al. |

FOREIGN PATENT DOCUMENTS

| | | |
|---|---|---|
| EP | 0633694 | 1/1995 |
| EP | 1294193 | 3/2003 |
| WO | WO9806045 | 2/1998 |
| WO | WO9909741 | 2/1999 |
| WO | WO0009741 | 2/2000 |
| WO | WO0103373 | 1/2001 |
| WO | WO0126271 | 4/2001 |
| WO | WO0156285 | 8/2001 |
| WO | WO02087235 | 10/2002 |
| WO | WO03088646 | 10/2003 |
| WO | WO2004062291 | 7/2004 |

OTHER PUBLICATIONS

BenAbdelkader, et al., "Combining Holistic and Parametric Approaches for Gait Recognition," Submitted to IEEE Transactions on Pattern Analysis and Machine Intelligence, Dec. 2002, 37 pages.

BenAbdelkader, et al., "EigenGait: Motion-based Recognition of People Using Image Self-similarity," Proc. Intl. on Audio and Video-based Person Authentication (AVBPA), 2001, 11 pages.

BenAbdelkader, et al., "Motion-based Recognition of People in Eigengait Space," 5th International Conference on Automatic Face and Gesture Recognition, May 20, 2002, pp. 1-6.

BenAbdelkader, et al., "Person Identification Using Automatic Height and Stride Estimation," IEEE International Conference on Pattern Recognition, Aug. 11, 2002-Aug. 15, 2002, pp. 1-4.

BenAbdelkader, et al., "Stride and Cadence as a Biometric in Automatic Person Identification and Verification," 5th International Conference on Automatic Face and Gesture Recognition, May 20, 2002, pp. 1-6.

BenAbdelkader, et al., "View-invariant Estimation of Height and Stride for Gait Recognition," Workshop on Biometric Authentication (BIOMET), in association with ECCV 2002, Jun. 1, 2002, 12 pages.

Cutler, et al., "Robust Real-Time Periodic Motion Detection, Analysis, and Applications," IEEE Transactions on Pattern Analysis and Machine Intelligence (PAMI), vol. 22, No. 8, Aug. 2000, pp. 781-796.

"Digital Headend Solutions; Tune in to Digital TV", retrieved from the Internet on Nov. 3, 2005, Available at [[http://www.tutsystems.com/digitalheadend/solutions/index.cfm]], 1 page.

Ding, et al., "Resource-Based Striping: An Efficient Striping Strategy for Video Servers Using Heterogeneous Disk-Subsystems", Multimedia Tools and Applications, vol. 19, No. 1, Jan. 2003, pp. 29-51.

Elgammal, et al., "Non-parametric Model for Background Subtraction," IEEE ICCV99 Frame Rate Workshop, IEEE 7th International Conference on Computer Vision, Kerkyra, Greece, Sep. 1999, pp. 1-17.

Gil, et al., "Simulation of a Mobility Prediction Scheme Based on Neuro-Fuzzy Theory in Mobile Computing", Simulation, Jul. 2000, vol. 75, No. 1, pp. 6-17.

Gonzalez, et al., "Load Sharing Based on Popularity in Distributed Video on Demand Systems", Proceedings 2002 IEEE Int'l. Conf. on Multimedia and Expo, vol. 1, Aug. 2002, pp. 5-8.

Halvorsen et al., "Q-L/MRP: A Buffer Muffer Management Mechanism for QoS Support in a Multimedia DBMS", IEEE 1998, pp. 162-171.

Haritaoglu, et al., "W4S: A Real-Time System for Detecting and Tracking People in 2 1/2 D," in European Conference on Computer Vision, 1998, 16 pages.

Hurst, et al., "MPEG Splicing: A New Standard for Television-SMPTE 312M", SMPTE Journal, Nov. 1998, pp. 978-988.

"Infovalue Experts; Info Value Unveils Industry's First Video Multicasting Solution with Instant Replay", retrieved from the Internet on Nov. 3, 2005, Available at [[http://www.infovalue.com/links/news%20room/press%20releases/1999/Press_%20First_Multicasting_with_Instant_Replay.pdf]], 3 pages.

Kamiyame et al., "Renegotiated CBR Transmission in Interactive Video-on-Demand System", IEE 1997, pp. 12-19.

Lee, "Staggered Push-A Linearly Scalable Architecture for Push-Based Parallel Video Servers", IEEE Transactions on Multimedia, vol. 4, No. 4, Dec. 2002, pp. 423-434.

Lo, et al., "Deploy Multimedia-on-Demand Services over ADSL Networks", PCM 2002; Lecture Notes in Computer Science, vol. 2532, Dec. 2002, pp. 295-302.

Lu et al., "Experience in designing a TCP/IP based VOD system over a dedicated network", IEE 1997, pp. 262-266.

McKinley, et al., "Group Communication in Multichanel Networks with Staircase Interconnection Topologies", Computer Communication Review, ACM, Sep. 1989, vol. 19, No. 4, pp. 170-181.

MediaFLO; Introducing FLO Technology:, retrieved from the Internet on Nov. 3, 2005, available at [[http://www.qualcomm.com/mediaflo/news/pdf/flo_whitepaper.pdf]], pp. 1-8.

"Multidimensional Database Technology", Computer, Dec. 2001, vol. 34, No. 12, pp. 40-46.

"Optibase MGW 2400", retreived from the Internet Nov. 3, 2005, Available at [[http://www.epecomgraphics.com/optibase_mgw2400_features.html]], 2 pages.

Petit et al., "Bandwidth Resource Optimization in Video-On-Demand Network Architectures", IEEE 1994, pp. 91-97.

"QuickTime Streaming your Media in Real Time", retrieved from the Internet on Nov. 3, 2005, Accessible at [[http://www.apple.com.tw/quicktime/technologies/streaming/]], 3 pages.

Song, et al., "Replica Striping for Multi-Resolution Video Servers", IDMS/PROMS 2002; Lecture Notes in Computer Science, vol. 2515, No. 2002, pp. 300-312.

State, et al.,"Active Network Based Management For QoS Assured Multicast Delivered Media", Joint 4th IEEE Int'l Conf. on ATM and High Speed Intelligent Internet Symposium, Apr. 2001, pp. 123-127.

Tsai, R., "An Efficient and Accurate Camera Calibration Technique for 3d Machine Vision," Proceedings of the Computer Vision and Pattern Recognition, 1986, pp. 364-374.

Turk, et al., "Face Recognition Using Eigenfaces," CVPR, 1991. pp. 586-591.

Wee, et al., "Splicing MPEG Video Streams in the Compressed Domain", IEEE 1997, pp. 224-230.

Wolfson, et al., "Modeling Moving Objects for Location Based Services", Lectures Notes in Computer Science, 2002, vol. 2538, pp. 46-58.

Wu, et al., "Scalable Video Coding and Transport over Broad-Band Wireless Networks", Proceedings of the IEEE, Jan. 2001, vol. 89, No. 1, pp. 6-20.

Zhang, et al., "Data Modeling of Moving Objects with GPS/GIS in Web Environment", International Conference on Communications, Circuits and Systems and West Sino Exposition Proceedings, 2002, vol. 2 pp. 1581-1585.

Zhang, et al., "The Cost Model of Moving Objects Communication with GPS", International Conference on Communications, Circuits and Systems and West Sino Exposition Proceedings, 2002, vol. 2, pp. 1576-1580.

Zhou, et al., "On-line Scene Change Detection of Multicast (MBone) Video", Proceedings of the SPIE-The International Society for Optical Engineering, Nov. 1998, vol. 3527, pp. 271-282.

* cited by examiner

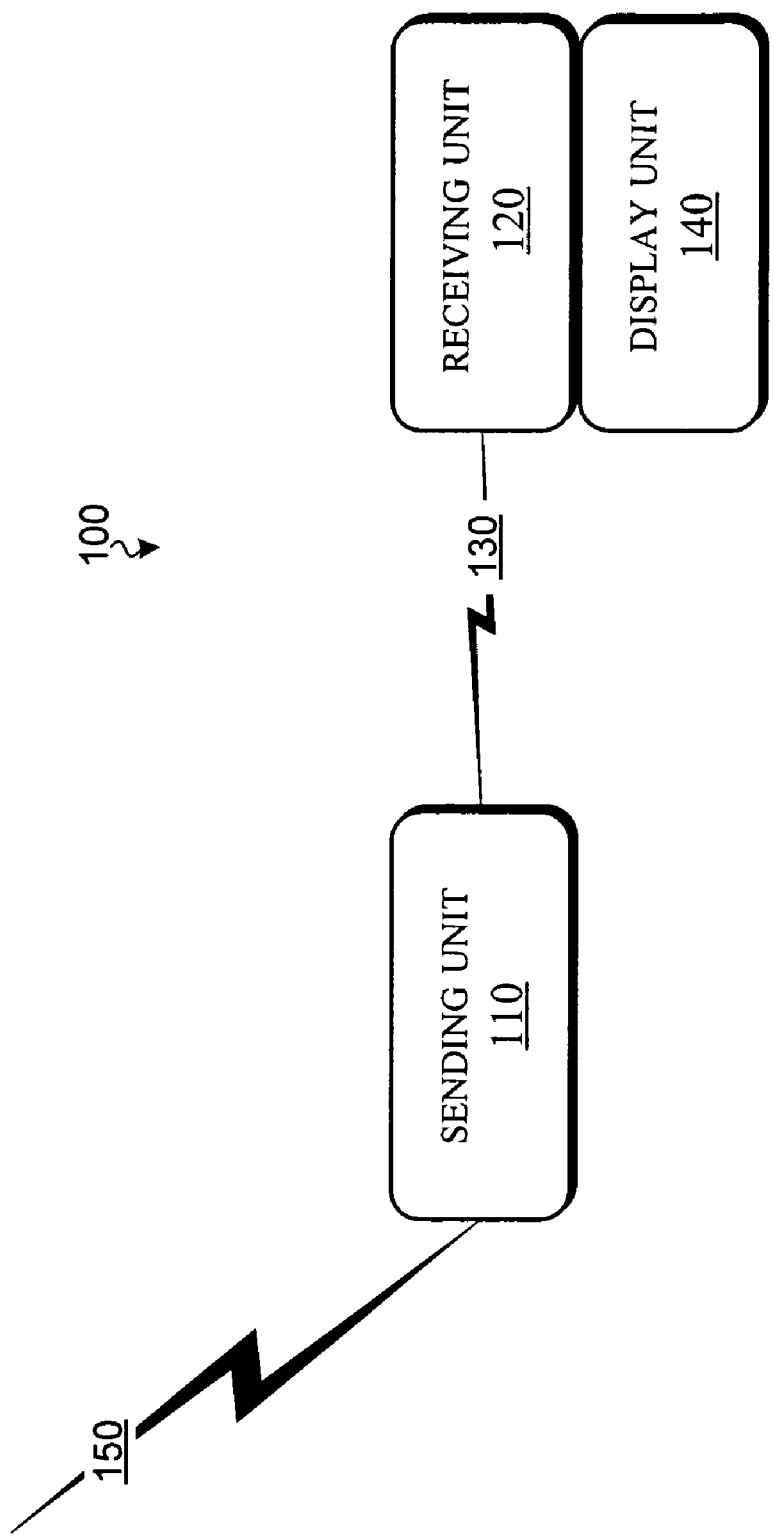

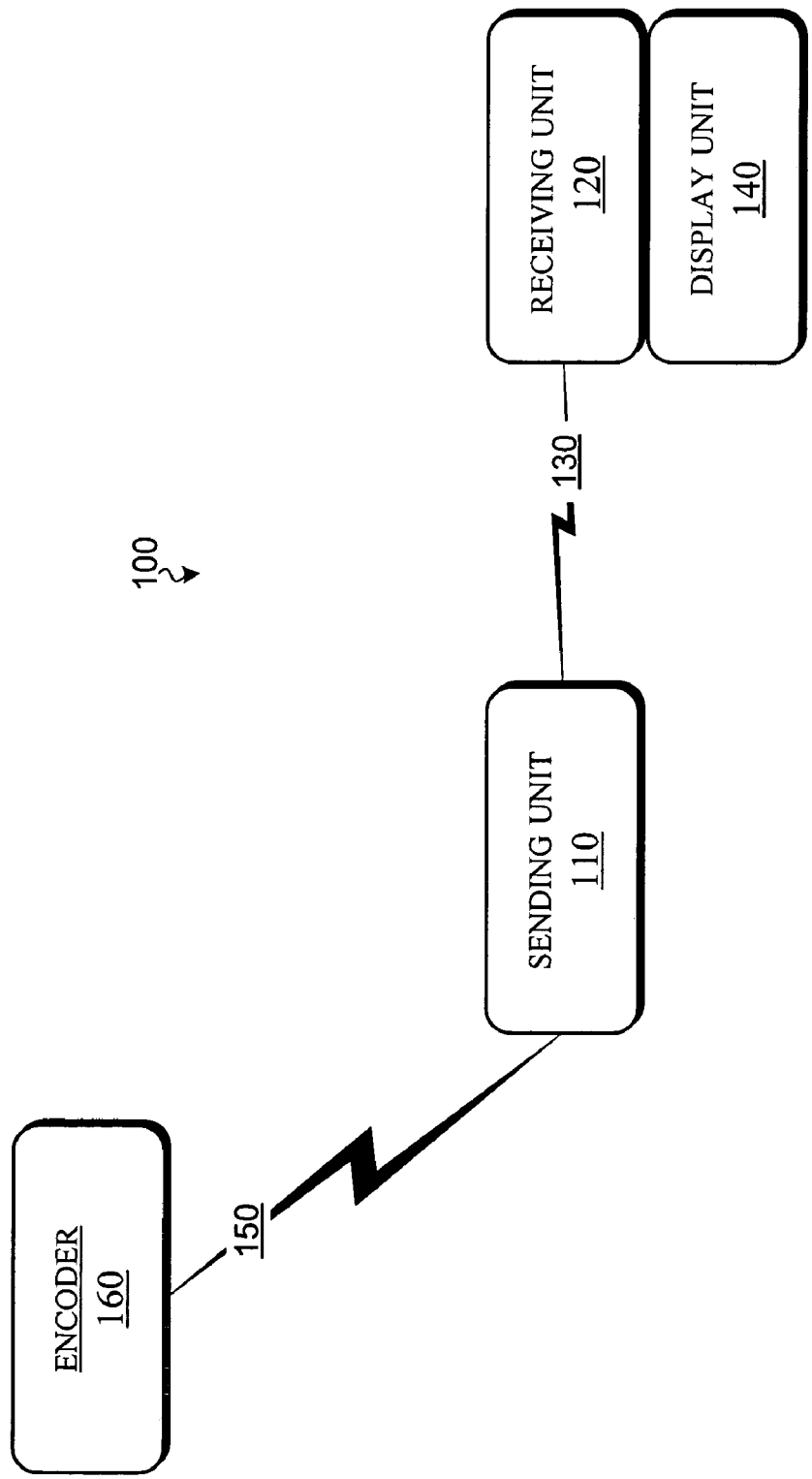

METHODS AND SYSTEMS FOR PRESENTATION OF MEDIA OBTAINED FROM A MEDIA STREAM

TECHNICAL FIELD

This invention generally relates to a data signal transmission technology.

BACKGROUND

Introduction

Digital media streaming technology can allow a user to see and/or hear digital media received from a remote location such as media sending unit. A user at a client or receiving unit may select a file for viewing. A user may alternatively select data from a real time encoder for viewing. Media or data from the selected file/encoder can be sent as a media stream to the receiving unit where it is played or otherwise presented for the user. Selecting a file can include various scenarios. For example, a user may click on a movie trailer at a web-site or change channels when watching TV through an internet provider. Since this media often includes data to create both audio and visual sensations it may be referred to as "multimedia" data or content.

Due to the amount of data required to accurately represent such multimedia, it may be compressed and encoded at an encoder before being sent to the client unit. To reproduce the original media for presentation, the media is typically decompressed and decoded before it is presented. Both the encoder and the decoder may utilize buffers to compensate for any variability in the bit rate of the content. This process is sometimes analogized to a leaky bucket model, where the encoder is encoding according to a leaky bucket and the client unit has a similarly sized bucket to avoid underflow. This comes about because the bit rate of the content may be somewhat variable, and the bucket size is basically a measure of the maximum variability of the bit rate.

Transmission of Media Streams

For practical purposes, media streams carrying audio and/or video from a media-stream encoder are typically not continuous, but are instead broken into multiple packets for transmission. In some formats such packets comprise one or more intra frames or I frames sometimes referred to as key frames. An I frame is encoded as a single image, with no reference to past or future frames.

Underflow

When a receiving unit runs out of data to decode (or present), it is called "underflow." Underflow occurs when the receiving unit is ready to decode (or present) the next frame, but the receiving unit has not yet received (or decoded) all of the data of that frame.

The practical and noticeable manifestation of an underflow is a temporal interruption (i.e., "hiccup" or "stutter") in the motion video presentation rather than the desired effect, which is a smoothly playing motion video. For example, instead of showing a motion video at a fixed frequency (e.g., 15 frames per second), a receiving unit experiencing underflow would show a frame of the video stream followed by a noticeable delay before the next or a later frame would display. This may continue for several seconds or minutes.

The conditions for an underflow are particularly ripe when a new file or encoded content is selected, i.e. changing channels. If the receiving unit immediately presents frames as soon as it receives and decodes the incoming media stream of the new channel, an underflow condition is likely to arise.

Instead, it is common for presentation of the multimedia data to be delayed for a time period sufficient to fill the client side buffer. As the multimedia data is decoded and presented, the receiving unit empties the data stored in its buffer. However, while the receiving unit is presenting decoded data, more encoded data is downloaded to re-fill the buffer. As long as the data is downloaded at least as fast as it is being played back in such a way that the buffer is never completely empty, the file should play smoothly.

The conventional techniques, described above, that are designed to prevent underflow, can produce an annoying delay between a user selection and actual presentation of the selection to the user.

SUMMARY

Various implementations described herein provide methods and systems for presenting media obtained from a media stream. At least one implementation, described herein, measures a rate (measured rate) at which a multimedia stream is received at a downstream component configured to present the multimedia to a user; and, ascertains a duration (measured duration) of time to buffer the received multimedia before presentation thereof, at least in part utilizing the measured rate.

BRIEF DESCRIPTION OF THE DRAWINGS

The same numbers are used throughout the drawings to reference like elements and features.

FIG. 1 represents a schematic diagram illustrating an exemplary media-stream network topology capable of (wholly or partially) implementing at least one embodiment described herein.

FIG. 1A represents a schematic diagram illustrating an exemplary media-stream network topology capable of (wholly or partially) implementing at least one embodiment described herein.

DETAILED DESCRIPTION

Overview

Figure 2:
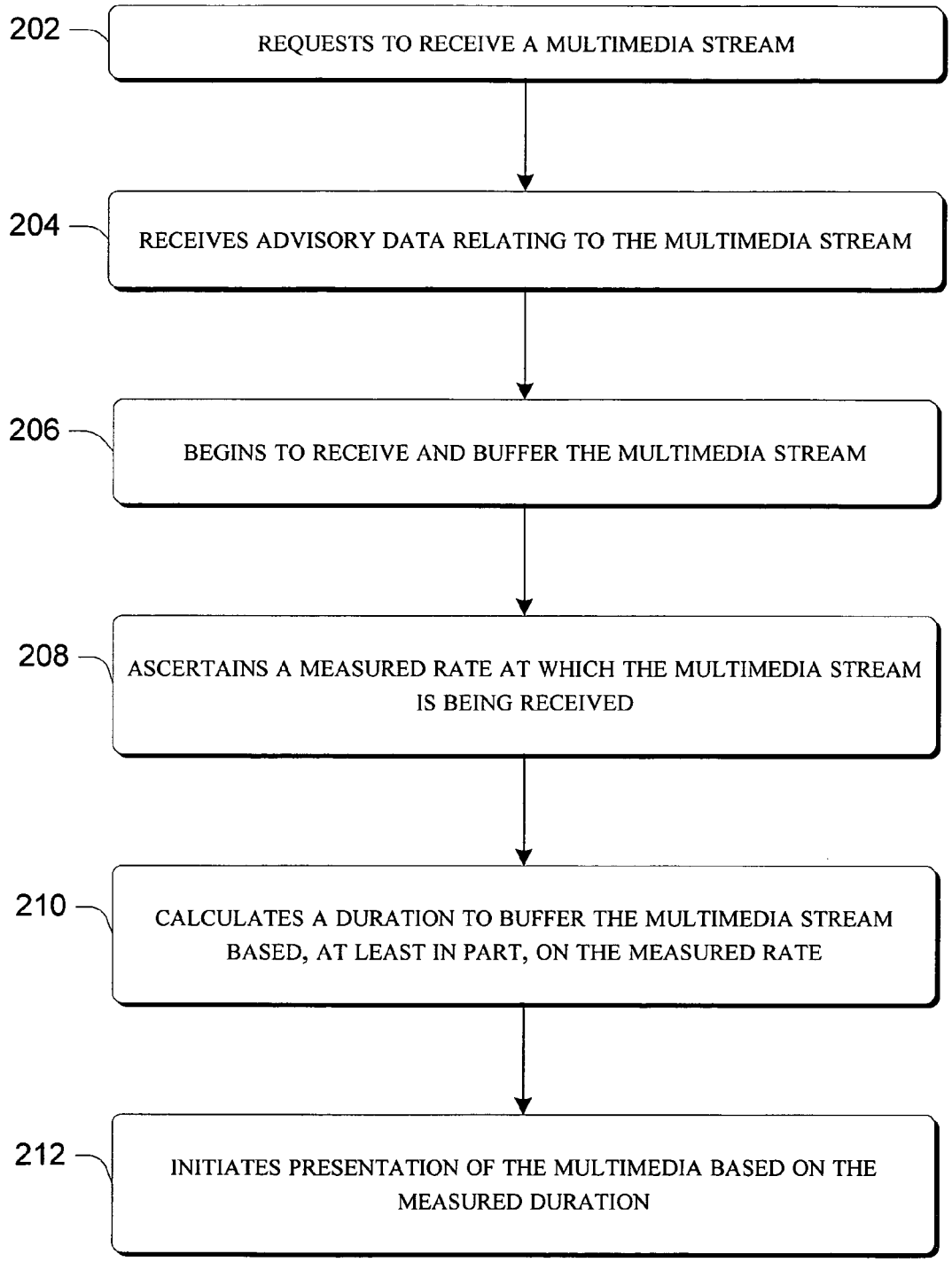
FIG. 2 represents a flow diagram illustrating a methodological implementation described herein.

The following systems and methods reduce buffering delay while mitigating stuttering of a multimedia presentation. Some implementations may reduce buffering delay while altogether avoiding stuttering of the presentation. A sending unit streams media from a selected file or live encoded session to a client unit (hereinafter the term "source" is utilized to refer to either a file or a session or equivalents). The term "streaming rate" is used to identify the rate at which the media is streamed from the sending unit to the client unit. Upon receipt, the client unit can immediately or subsequently present the streamed media to a client or user. A rate at which the data is utilized for the presentation is known as the presentation rate. The average presentation rate may be approximately equal to the average streaming rate; however, at instantaneous points in time, the streaming rate and the presentation rate may be different.

Prior to streaming the media, the sending unit sends advisory data relating to the media to the client unit. The advisory data is described in more detail below and can comprise various components such an acceleration rate at which the sending unit will stream the media, an acceleration interval, various buffer values, a start-up profile, and/or a recommended or estimated buffer duration, among others. The acceleration rate is the streaming rate at which the sending unit will attempt to send data, expressed relative to the presentation rate, or it could be expressed as an absolute value in terms of bits per second or bytes per second. The sending unit may start streaming at an acceleration rate, such as two times (2×) the presentation rate, for a duration of time known as the acceleration interval. Typical acceleration rates could be in the range of 1.0×, 1.2×, 1.5×, 2.0×, and 3.0×, though these are simply examples and any other value can occur depending on the characteristics of the sending unit and the intervening network between the sending unit and the client unit.

The client unit can buffer data in order to have sufficient data to avoid an underflow condition during the presentation. The client unit can add data to the buffer in at least two ways. First, the client unit can buffer initially before beginning presentation of the multimedia. In such an instance all of the received data is buffered. However, such buffering results in start-up delay where start-up delay is the period between, for example, a user pressing play and actually seeing or hearing the multimedia presentation. Second, the client unit can also buffer during the acceleration interval while presenting the media since the client unit may be receiving data at a greater rate than it is presenting the data. In one example of the later instance, a presentation rate may be at 1 megabit per second (Mbps). The sending unit may stream the media during the acceleration interval at 2× or 2 Mbps. The client unit can buffer this excess data for the duration of the acceleration interval while simultaneously utilizing data for the presentation.

The advisory data can, in some implementations, comprise a start-up profile(s). Generally, the start-up profile can relate to the amount of buffer required or recommended at one or more points in the presentation to avoid underflow. The sending unit can compile an estimated start-up profile before sending the media stream. In various implementations an estimated or first start-up time is calculated which satisfies the start-up profile at an estimated acceleration rate. The start-up time is a measure of the amount of buffer that the client should accumulate from when the client unit begins to receive the media stream until beginning to present the media. This amount of buffer can be measured either in units of bits, or in units of time, where units of time are simply the bit values divided by the average bit rate.

Once the client unit begins to receive the media stream the start-up time can be verified, or recalculated. Some implementations can recalculate the start-up time or buffer duration utilizing a measured acceleration rate at which the client unit is receiving the media stream. Utilizing the start-up profile, along with the actual measure of the amount of data buffered during the acceleration interval, can allow a more accurate second or measured start-up duration to be calculated. Other implementations may simply utilize the measured acceleration rate to verify the accuracy of the estimated start-up duration before beginning to present the multimedia.

In some implementations, the method can compare the measured acceleration rate to the earlier estimated acceleration rate and act accordingly. If the comparison shows that the measured acceleration rate is slower than the estimated acceleration rate then the method can recalculate the buffer time and buffer longer. If the data is received at a rate which exceeds the estimated rate then the method may be able to shorten the buffer time. The amount of pre-start-up buffering calculated in this way may be substantially reduced compared to existing technologies. This recalculation of the startup profile can occur at any point after the client begins to receive data. For example it could occur at regular time intervals of say 100 ms or it could occur at fixed fractions of the initial estimated startup time—for example at 50% of the initial calculated buffer time.

The client unit is the device closest to presentation of the file to the user, or stated another way, the client unit is the device farthest downstream. Various delays, bottlenecks and/or other intervening conditions along the media path result in the client unit being in a better position to make the start-up calculations than upstream components.

Among other advantages, allowing the client unit to determine how long to buffer data prior to start-up can reduce inaccuracies in the buffer time which might otherwise result from intervening events. For example, an upstream sending unit may calculate a buffer duration for an estimated transmission rate that it intends to stream the media to the client unit. The client unit may in fact receive the media stream at a different, e.g. higher or lower rate. As such a calculation made by the client unit can be more accurate than one made at the sending unit. The client unit can have the most accurate view of the rate at which it is receiving data and can most accurately calculate the amount of time it should buffer in order to avoid underflowing.

Exemplary Implementations

The following description sets forth one or more exemplary implementations of methods and systems for presentation of media obtained from a media stream that incorporate elements recited in the appended claims. These implementations are described with specificity in order to meet statutory written description, enablement, and best-mode requirements. However, the description itself is not intended to limit the scope of this patent.

Media-Stream Network Topology

FIGS. 1 and 1A illustrate high level representations of exemplary media-stream network topology 100 in which the techniques, systems, and other aspects described herein may be implemented (partially or wholly).

The exemplary topology 100 includes one or more media-stream sending units 110 such as a server, which is communicatively coupled to a receiving or client unit 120 via a transmission means 130. Receiving unit 120 can comprise, among others, a personal computer (PC), cell-phone or set-top box. In this embodiment, receiving unit 120 further comprises a display or presentation device 140 which comprises a display screen and one or more speakers. The functionality of the sending unit can be achieved by a single component or multiple components, similarly the functionality of the client unit can be achieved by a single component or multiple components.

Sending unit 110 can store sources such as files for transmission to receiving unit 120 and/or can access the sources via network 150. In various embodiments, network 150 may be a limited access network or can comprise the internet, among other configurations. Network 150 may be coupled to an encoder 160 for encoding and compressing multimedia data or content which is accessed by sending unit 110. Alternatively, sending unit 110 can encode the media prior to streaming it over transmission means 130 to client unit 120 which can decode the media prior to presentation.

Topology 100 can allow a user engaging client unit 120 to select a source, such as a file, for presentation. Client unit 120 can request that sending unit 110 stream media from the file to the client unit. Transmission means 130 can comprise any suitable transmission means such as Ethernet, broadband, dial-up and wireless. Client unit 120 can present the media to the user via presentation device 140. Although client unit 120 and presentation device 140 are described here as distinct components, other implementations may integrate their functions into a single unit.

First Exemplary Method and Implementation

FIG. 2 represents a flow diagram of acts in accordance with one method for presentation of media obtained from a media stream.

Act 202 requests to receive a multimedia stream. Such a request can be initiated by a user as a selection on a client unit. For example, the user may click on content in a web-browser, or may switch channels while watching TV over an internet provider. The request may simply be to stream a selected source such as a file or may be more specific. For example, the request may be to stream content corresponding to 10 seconds of presentation time starting at 20 seconds into the selected file. The request can cause the file corresponding to the play request to be accessed, such as by the sending unit.

At least in part by accessing the source, advisory data associated with presentation of the source's data can be obtained. Advisory data can comprise information stored in a header of the file by a program which originally created the file. This program examines the file to determine a maximum or recommended amount of buffer for any point in the file. The buffer data can be written into a file header where it can be accessed by the sending unit.

The sending unit may simply gather the advisory data and send it to the client unit. In other implementations the sending unit may process various components of the advisory data, such as the buffer data, prior to sending it to the client unit. In some examples, the sending unit calculates one or more estimated start-up profiles which it sends to the client unit. The start-up profile can relate to the amount of data which the client unit should acquire at various points in the presentation. For example, the start-up profile can comprise a set of values indicating the maximum amount of underflow, the time at which the underflow occurs, and the acceleration rate used to calculate the underflow. In some implementations described below, data relating to multiple acceleration rates can be contained in a single start-up profile. Other implementations may generate separate start-up profiles for individual acceleration rates.

In one implementation, the start-up profile is calculated by adding the packet sizes at each presentation time to determine presentation requirements at various times during presentation of the file. Based upon various specific acceleration rates, the method can calculate an estimate of how much data the client should have received due to accelerated streaming at each presentation time. The method can provide an estimated buffer duration prior to beginning the presentation in order to avoid underflowing the client buffers (running out of data).

The start-up profile can comprise various forms. In but one example, the start-up profile comprises a data array. Array elements can be in relation to specific acceleration rates. For example, for each acceleration rate the array comprises an underflow byte value and the time at which this underflow occurs.

In some implementations, the start-up profile relates to two buffering conditions for a given acceleration rate. The first buffering condition can relate to a recommended or estimated buffer size prior to starting presentation of the file. The second buffering condition can relate to a recommended buffer size at the end of the acceleration interval. These two conditions will be described in more detail below.

The first buffer condition can be utilized to calculate how long the client unit should buffer initially so that by each underflow time it has at least an adequate number of bytes to reduce and/or avoid stuttering. The second buffer condition relates to calculating a worst case buffer scenario to ensure that when the client unit finishes the acceleration period that it has a sufficient amount of buffer for any point in the presentation. This worst case buffer scenario can be the header value that was written by the encoding process that indicates the recommended amount of buffer that the client should have to avoid underflowing for the worst case or most "action" portion of the content. This second calculation is based on the premise that the client unit should only rely on increasing its buffer amount during the acceleration interval. In some implementations, the sending device sends, in the advisory data, the header values relating to the recommended amount of buffer. In other implementations, the sending device, as part of the advisory data may expressly provide a recommended full buffer value for the client device to achieve by the end of the acceleration interval.

In such an implementation, the method determines an amount of buffered data sufficient for the entire presentation which the client unit should achieve prior to leaving the acceleration interval. New data is of course added to the buffer during the presentation as the client unit continues to receive streaming media, but the new data is added at a rate which is closer to the rate that data is decoded for presentation. As such the total buffer size should not be depended upon to increase significantly. This implementation of the method calculates a buffer duration before presentation to satisfy both of these two buffer values at the estimated acceleration rate that the sending unit intends to stream the media.

In still another implementation, the sending unit may perform the buffer calculation, and simply pass the client unit a single value for the amount of time that the client unit should buffer. Alternatively, the sending unit can pass an array of buffer times to the client unit, for different acceleration rates, and the client unit can simply pick the time closest its own measured acceleration rate, or interpolate a more accurate value. The skilled artisan should recognize that these are but examples of which components execute the algorithm(s). For example, in some implementations more or all of the calculations may be executed by the sending unit. In still other implementations, more or all of the calculations may be executed by the client unit.

Exemplary Sending Unit Algorithm

This section describes a more detailed example of an exemplary algorithm utilized by the sending unit in one implementation. This algorithm is configured to function with various client requests. In one such example, the client requests to join an already running broadcast publishing point such as a TV program. In another such example, the client requests to play a file from an on-demand publishing point that might be referenced on a web-site.

For the broadcast publishing point example, the method finds the I frame that will be the starting point of the media it streams to the client unit. The algorithm below operates on that set of data which will be sent to the client unit, namely from that I frame onward. In the on-demand example, the calculation simply starts at the first packet in the presentation. Alternatively, the user can seek to any point in the file. In that case the method finds an I frame close to that seek point and begins sending data from that point. The calculation begins from that I frame.

In the case of real time encoded content, there is no actual file that is streamed to the client unit. However, the sending unit may buffer some amount of the real time content, and send data from that buffer to the client unit. That buffer is logically equivalent to a file in many ways for the purposes of startup profile. That buffer could be arranged in a circular manner where as new data is added on, old data is deleted from the end. In order to provide acceleration from the sending unit to the client unit for real time encoded content, the sending unit simply sends part of this buffered amount more quickly than the actual playback rate to the client.

In this particular implementation, the sending unit generally performs a profiling process that is used to find peaks in client unit buffer requirements over a particular period of the media stream. This particular implementation calculates the data for each presentation time, by summing the previous packet sizes. The data for any particular presentation time is the sum of all packets with lesser presentation times. This value is a measure of the amount of data that the client unit should have, in order to avoid under-flowing.

The implementation further calculates the average bit rate of the stream by taking the number of bytes sent to the client unit up to that point, i.e. presentation time, and dividing it by the difference in send time. This value is the local actual average bit rate, and it could be different from the average bit rate value stored in the file header, over portions of the stream. This particular implementation utilizes this value rather than the average value from the file header because it may be more accurate over the portion of the file which is being examined.

The implementation calculates an amount of streamed data which will be sent to the client unit at each of the same presentation time values, using the above calculated average. The method can do this calculation for several acceleration rates.

The implementation can calculate the estimated excess amount of client buffer at each interval by subtracting the second number from the first (needed data−streamed data), for each acceleration rate. As long as this number is negative, the client will be streamed more data than it needs and it will not underflow. However if this value is positive at any point in the presentation then an underflow condition will exist at the client unit.

The method also keeps track of the largest underflow value of the client buffer and the presentation time at which the largest underflow occurs for each acceleration rate. The point in the presentation time where the client will have the greatest buffer requirements may change as the acceleration rate changes. In such circumstances the method calculates the underflow values at several acceleration rates.

This will produce one underflow value, such as an amount of data, and presentation time of that underflow value for each acceleration rate. The underflow value will often be different for each acceleration rate, because the rate at which data is delivered to the client will be different due to the differing acceleration rates. However, the presentation time value for each underflow could be the same for several acceleration rates, or it could be different. Depending on the shape of the estimated data delivery versus time curve different acceleration rates could yield underflows at different times.

This implementation then can send the client unit these calculated underflow buffer values and the times at which they occur, the acceleration rate used to calculate them and the average bit rate to that point in the presentation. In some instances the advisory data compiled above can be sent to the client unit as the start-up profile for the client unit, where the start-up profile contains an estimated buffer duration as calculated by the sending unit. For example, the sending unit may send the amount of buffer utilized for each of one or more acceleration rates, one of which may be the estimated acceleration rate at which the sending unit intends to stream the data. Based at least in part upon this buffer data, the client unit can subsequently interpolate or otherwise calculate the best value to use knowing more accurately what its acceleration rate is as will be described in more detail below. Other implementations may have even more of the calculations done by the sending unit. For example, the sending unit could monitor the amount of data that it has sent to the client unit and then send a signal to the client to exit buffering and begin presentation.

One example of such a start-up profile is provided below.

X-StartupProfile:

Rate=10, 12, 15, 20, 30; MaxBytes=123424, 113482, 103245, 94030, 85125; Time=520, 280, 160, 120, 40; StartTime=5500; LastTime=1640; MaxDiffTime=0; MaxDiffSndTime=0; ByteRate=135626, 126514, 119730, 116204, 106546

Act 204 receives advisory data relating to the multimedia stream. As described above, the advisory data can relate to the start-up profile at one or more acceleration rates which can be employed by the sending unit and supported by the intervening network or transmission means since the network itself may be the limiting factor in the achievable bit rate between the sending unit and the client unit.

Below is but one example of a header utilized by the sending unit and client unit to convey which features are supported by the respective devices. In this particular example the sending unit and client unit can support advisory data in the form of a start-up profile(s).

Supported: com.microsoft.wm.startupprofile

Some implementations may allow the client unit to have some interactive ability or algorithmic ability to control the sending unit based upon the advisory data. For example, the client unit may choose an acceleration rate, and an acceleration interval based upon the advisory data, and request the sending unit to stream the media accordingly. In another example, the sending unit may determine the acceleration rate, but the client unit may be allowed to request the acceleration interval. As will be described in more detail below, at any acceleration rate the client unit can calculate how long the sending unit should accelerate, to avoid additional start-up delay due to the full buffer value at the end of the acceleration interval. Therefore, upon receiving the advisory data, specifically the estimated acceleration rate from the sending unit, the client unit may calculate and request a corresponding acceleration interval. Alternatively, the client unit may calculate and request a corresponding acceleration interval before it has actually received the advisory data. It may pass this requested acceleration interval to the sending unit during the initial request to receive the media stream.

In other implementations, the sending unit makes decisions regarding the media stream without deference to the client unit. In one such implementation, the sending unit simply informs the client, in the advisory data, of the estimated acceleration rate and the acceleration interval and streams the media. Note that in some network topologies the acceleration interval is accurately controllable by the sending unit whereas the acceleration rate depends on the characteristics of the intervening network as well as the rate at which the sending unit is sending.

If the advisory data contains an estimated acceleration rate and resultant estimated buffer duration the method can proceed to act 206. Alternatively or additionally, the client unit may determine an estimated acceleration rate and/or associated estimated buffer duration before proceeding to act 206. For example, the client unit may estimate the acceleration rate of the future stream utilizing packet pair or run time packet pair. In another example the client determines the estimated rate via a URL modifier such as "?wmbitrate=xxx".

One example for calculating the estimated buffer duration can be seen in the following scenario. In this instance the acceleration interval is 1.0 seconds, the average presentation rate is 1.0 Mbps and the worst case buffer demand is 2.5 megabits of data. The estimated acceleration rate is 3 Mbps. As such 2.0 megabits of data can be buffered during the acceleration interval if playback occurs as soon as streaming commences leaving a person to believe that 0.5 megabits should be buffered prior to presentation. However, since there must be some buffering prior to playback, the client will not experience acceleration for a full 1 second after playback starts because part of that acceleration time will be spent in buffering before playback starts. In this particular case if the client buffers for ½ second it will acquire $3/2=1.5$ Mbits of data. Then it plays for ½ second during which time the sending unit is still accelerating at 3 Mbps, but 1 Mbps is consumed by playback, therefore 2 Mbps is available to be buffered. Since this goes on for ½ second then ½×2=1 Mbit of data is buffered during playback. This results in 1.5+1=2.5 megabits of data in the buffer at the end of the acceleration interval, which is sufficient to avoid stuttering. The 2.5 megabits that should be buffered is divided into two pieces: the 1.5 Mbits buffered before the presentation starts and the 1.0 Mbits buffered after the presentation starts.

Act 206 begins to receive and buffer the multimedia stream. The media stream can be received by the client unit from the sending unit. Buffering can be started based upon the estimated buffer duration described above.

Act 208 ascertains a measured rate at which the multimedia stream is being received. The client unit may measure the rate itself or may ascertain the receiving rate from a third party component. The skilled artisan should recognize suitable methodology for measuring the rate at which the media stream is being received at the client unit.

Act 210 calculates a duration to buffer the media stream based, at least in part, on the measured rate. Hereinafter this duration will be referred to as the measured buffer duration or measured duration to distinguish it from the estimated buffer duration described above and is not intended to imply that the duration is itself measured but rather that the measured buffer duration is calculated utilizing the measured acceleration rate. The measured buffer duration can be more accurate than the estimated duration, based on the worst case buffer requirements of the entire multimedia content file, and can allow the method to reduce the likelihood of stutter while reducing start-up time.

In this example, it may be that the client unit is not actually receiving the streaming media at the estimated rate. As a result, the estimated buffer duration may actually be too short or longer than necessary. As the method approaches the estimated buffer duration, the measured acceleration rate is utilized by the client unit to recalculate the startup profile calculation to see, if in fact, it has buffered long enough at the measured acceleration rate to buffer adequate data.

If the calculation reveals that the client unit has not buffered long enough, then the client unit will buffer an incremental amount. For example the client unit may choose to recheck the buffer calculation when the amount is half the difference between the estimated buffer duration and the measured buffer duration. The client may wish to put a minimum bound on this difference, such as looms to avoid performing the calculation repeatedly in a small time interval. When this extra buffer duration is achieved, the client again performs the startup profile calculation with the current measured acceleration. Since the acceleration may vary somewhat, it is possible that the value is now higher and potentially the client is able to exit the buffering state at this point. One reason for choosing a new buffering time that is half the difference between the old and new, is to give the client unit the opportunity to exit buffering as quickly as possible.

Exemplary Client Algorithm

This particular implementation utilizes the data array of the start-up profile supplied by the sending unit as described above. The startup profile data also includes a measure of the total amount of presentation time profiled on the sending unit as well as the maximum difference between the audio and video send times, if the audio is sent after the video. The audio and video send times are discussed in more detail below.

In this particular instance individual elements of the array for each acceleration rate comprise an underflow byte value, the time at which this underflow occurs, the acceleration rate used in this calculation, and the average bit/byte rate of the file up to that point. The sending unit's start-up profile indicates a number of extra bytes out in the future (above the average streaming rate multiplied by acceleration) that the client should have in its buffer at a particular time to avoid underflowing. As stated above, the client unit acquires those extra bytes two ways: by initial buffering and by acceleration during the streaming time. The client unit calculates how long it has to buffer initially so that by each underflow time T, it has at least the right number of bytes to avoid an underflow.

The data array provides underflow values which are tied to a specific acceleration. Thus, the sending unit is telling the client unit the amount of underflow that will occur for specific values of acceleration at some point T in time. It is very unlikely that the measured acceleration rate at which the client unit receives the media stream exactly matches the sending units' estimated acceleration. As such, initial buffer durations of the data array may result in the client unit buffering too much or too little data. The client recalculates the amount of buffer; using its own measured acceleration. In this particular implementation the client unit then interpolates its own value for underflow at the measured acceleration rate that it achieves.

This exemplary client calculation proceeds as follows:

The client estimates the acceleration rate or relies on an estimate from the sending unit to determine the estimated buffer duration.

Once the client unit begins to receive the media stream and ascertains the measured rate at which it is receiving the media stream it can utilize the measured rate to calculate the measured buffer duration for each of the underflow/time pairs passed to it by the sending unit, using the sending unit's average bit rate of the content.

In this implementation, the sending unit may have previously sent in the advisory data a maximum acceleration parameter which tells the client that it will not send data any faster than a particular amount. The client unit utilizes this amount as an upper bound on the acceleration parameter in the calculation. Knowing the measured acceleration rate the client unit can calculate the number of excess bytes it will have accrued (due to acceleration) by any particular time after it starts presenting.

The client unit then subtracts the calculated bytes from the underflow byte value passed down by the sending unit. If there is a positive result then the client unit should buffer long enough to accumulate that extra number of bytes. The client unit keeps track of the maximum value of the buffer bytes using each of the underflow/time value pairs from the sending unit in its calculation. The client interpolates each underflow value from the sending unit to its own measured acceleration rate, before using that value in the calculation. Rather than keeping track of buffer bytes, the client can equally well perform the calculation in the time space by dividing the byte values by the average bit rate value passed down from the sending unit. Using time rather than bytes might be more convenient for some client units that use presentation or send time (rather than acquired bytes) as the measure of how much data they have received, and when to exit buffering and start playback.

In an alternative implementation, the client unit calculates the measured buffer duration only for the underflow/time pairs passed to it that most closely matches its measured acceleration rather than performing the calculation for all underflow/time pairs. The client unit may also use some other subset of the underflow/time pairs, such as the two pairs closest to its own measured acceleration.

Additional Factors

Send Chunk Size

As noted above, streaming media commonly comprises grouped packets that are sent at intervals rather than continuously. In recognition of this process, some implementations may add an estimate of sending unit bandwidth variation, which is the interval between sends from the sending unit. For example, with some sending unit configurations, the sending unit will send data in 1 second chunks. On a link that is high speed relative to the content, sending data in large chunks could cause the client to come out of buffering too early if no account is taken of this chunk size.

The reasoning for such occurrences is that following each large chunk send there may be a significant period (almost 1 second) where no data will arrive from the sending unit. However, in some configurations, the client calculation assumes that data is arriving linearly at the accelerated rate. If it just barely gets enough buffered data to satisfy its buffer requirements from the 1 second send, then it will likely run out of data before the next 1 second send occurs, because it is assuming that it received data linearly at the average acceleration rate.

To avoid this problem the sending unit can send an indication of its send chunk size to the client unit, and the client unit adds this amount to its buffer time. In one such example where the sending unit sends in 150 ms chunks (for 1.2 Mbit content). Responsively, the client can add 150-200 ms to its startup calculation to avoid this chunk effect.

Audio Video Separation

In some implementations the advisory data received at act 204 may contain information relating to any separation of corresponding portions of the audio and video in the media stream. In some file formats corresponding audio and video data may not be sent together. For example, if the video for presenting at time 1 second is 1000 bytes into the file and the audio for the same 1 second presentation time is 2000 bytes into the file then the client unit has to wait for the audio before presenting this portion of the file. This factor may outweigh other fast start-up buffer considerations since it would be undesirable to begin presentation until the client unit has both the corresponding audio and video. For example, if the audio is three seconds later than the video, the method may wait for that 3 second duration even if it otherwise has enough buffer to start playback and avoid stuttering. In one such implementation, the sending unit sends this information to the client unit as a header. One header for the audio video relationship and one for the startup profile buffer times for given acceleration rates.

In one such implementation, the sending unit attempts to quantify the lateness of the audio with respect to the video by looking at the difference in the presentation times of the audio and video packets in the file.

In this particular implementation, each time an audio packet is encountered, the method calculates the difference between the presentation time of the last video packet and the audio packet. When this value is positive (video presentation time is greater than the audio presentation time) it means that the audio data corresponding to this video sample is at some point further along in the file—at some point in the future and the client unit will have to wait for that audio to be able to synchronize audio and video. The method can save the maximum of the values calculated in the first step, as a worst case measure of how far behind the audio is relative to the video. The method can then send the maximum value of the audio lateness to the client unit.

This particular implementation can repeat this calculation each time it identifies an audio sample, it can then add the difference in send time to the calculated value, since this sample will be sent that amount of time later, contributing further to the lateness of the audio.

In another implementation a video sample is spread across several packets with an audio sample interspersed. The calculation can find the last video packet at a given presentation time and compare that against the audio presentation time.

Act 212 initiates presentation of the multimedia based on the measured buffer duration. The presentation can be initiated at a reduced time while mitigating and/or avoiding stutter during the presentation.

Second Exemplary Method and Implementation

Figure 3:
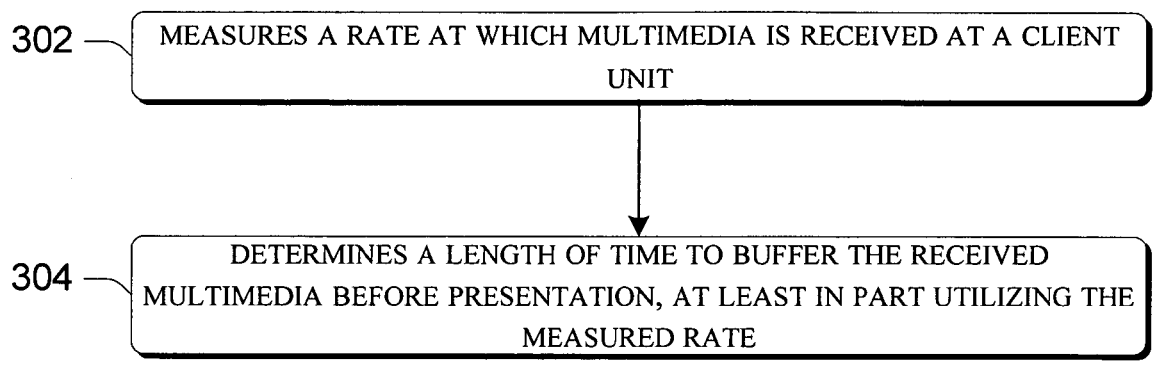
FIG. 3 represents a flow diagram illustrating a methodological implementation described herein.

FIG. 3 represents a flow diagram of acts in accordance with one method for presentation of media obtained from a media stream.

Act 302 measures a rate (measured rate) at which multimedia is received at a downstream component configured to present the multimedia. Measuring the rate at which the multimedia is being received can be achieved utilizing any suitable means. Measuring the receive rate at this relative position can reduce discrepancies, such as those caused by intervening events or conditions, which may reduce the accuracy of attempting to estimate such a rate farther upstream.

Act 304 determines a duration of time to buffer the received media before presentation, at least in part utilizing the measured rate. In but one implementation, the method begins buffering the streaming media and calculates a duration to buffer prior to starting playback based upon the measured receive rate. Utilizing the measured rate in the buffer duration calculation can result in a reduced start-up time while still avoiding stuttering of the presentation. Acts 302 and 304 may be repeated multiple times prior to beginning presentation of the media to even more precisely determine the buffer duration.

Computing Environment

The one or more embodiments, as described herein, may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, cell phones, multiprocessor systems, microprocessor-based systems, set-top boxes, programmable consumer electronics, network PCs, minicomputers, mainframe computers, distributed computing environments that include any of the above systems or devices, and the like.

The one or more implementations, as described herein, may also be practiced in distributed computing environments where tasks are performed by remote processing devices that are linked through a communications network. In a distributed computing environment, program modules may be located in both local and remote computer storage media including memory storage devices.

The one or more implementations, as described herein, may be described in the general context of processor-executable instructions, such as program modules, being executed by a processor or a computer. Generally, program modules include routines, programs, objects, components, data structures, etc. that perform particular tasks or implement particular abstract data types and functions. Typically, the functionality of the program modules may be combined or distributed as desired in various embodiments.

CONCLUSION

The above described implementations allow a unit configured to actually present media content to a user to make the final determination regarding a duration to buffer a media stream before presenting the media to the user. Such a configuration can reduce buffer duration while mitigating and/or avoiding stuttering during the presentation.

Although the inventive concepts are described in language specific to structural features and/or methodological acts, it is to be understood that the inventive concepts described in the appended claims are not necessarily limited to the specific features or acts described. Rather, the specific features and acts are disclosed as exemplary forms of implementing the claimed inventive concepts.

The invention claimed is:

1. A computer-readable storage medium having processor-executable instructions that, when executed by a processor, performs a method comprising:
    receiving advisory data relating to a multimedia from an upstream component, wherein the advisory data comprises a start-up profile with an amount of buffer recommended at one or more points in a presentation of the multimedia to avoid an underflow, wherein the upstream component calculates the amount of buffer recommended based at least in part on the start-up profile;
    receiving at a downstream component a multimedia stream comprising the multimedia from the upstream component;
    measuring a rate (a measured rate) at which the multimedia stream is received at the downstream component configured to present the multimedia to a user;
    ascertaining a duration (a measured duration) of time to buffer a received multimedia before presentation thereof, at least in part utilizing the measured rate and the start-up profile, wherein the downstream component buffers the multimedia according to the amount of buffer recommended while adjusting the amount of buffer as it ascertains the measured rate; and
    recalculating the measured duration after the presentation is started by utilizing, at least in part a measure of data already buffered and the start-up profile.

2. A medium as recited in claim 1 further comprising prior to said measuring, receiving advisory data that provides a cumulative buffer amount for the presentation at an estimated acceleration rate.

3. A medium as recited in claim 2 farther comprising, determining an estimated duration to buffer the received multimedia before presentation based, at least in part, on the estimated acceleration rate and the cumulative buffer amount.

4. A medium as recited in claim 1 further comprising prior to said measuring, receiving advisory data that provides a data array for one or more acceleration rates, and wherein for individual acceleration rates the data array contains a corresponding underflow byte value, a time in the presentation when the underflow byte value occurs, and an average data rate to a given point in the stream.

5. A medium as recited in claim 4 further comprising, determining an estimated duration to buffer the received multimedia before presentation for each of the acceleration rates of the data array.

6. A medium as recited in claim 5, wherein determining the measured duration comprises interpolating the measured rate between a higher data array acceleration rate and a lower data array acceleration rate.

7. A computing device comprising a medium as recited in claim 1.

8. A computer-implemented method having instructions stored on a computer-readable storage medium and executable by a processor for facilitating fast start-up of a new multimedia stream associated with a source, the method comprising:
    requesting to receive a multimedia stream from the source, wherein the multimedia stream comprises a multimedia;
    receiving advisory data relating to the multimedia stream from the source, wherein the advisory data comprises a start-up profile with an amount of buffer recommended at one or more points in a presentation of the multimedia to avoid an underflow, wherein the source calculates the amount of buffer recommended based at least on the start-up profile;
    beginning to receive and buffer the multimedia stream according to the amount of buffer recommended;
    ascertaining a rate (a measured rate) at which the multimedia stream is being received;
    calculating a duration (a measured duration) to buffer the multimedia stream based, at least in part, on the measured rate and the start-up profile, and adjusting the amount of buffer as the measured rate is ascertained;
    initiating the presentation of the multimedia based on the measured duration; and
    recalculating the measured duration after the presentation is initiated by utilizing at least a measure of data already buffered and the start-up profile.

9. A method as recited in claim 8, wherein said receiving comprises receiving advisory data that comprises an estimated buffer duration prior to beginning presentation of the multimedia for an estimated acceleration rate at which an upstream component intends to stream the multimedia.

10. A method as recited in claim 8, wherein said receiving comprises receiving advisory data that comprises a data array of acceleration rates, and wherein individual acceleration rates are associated with cumulative buffer amounts for the presentation, and wherein the data array further comprises an estimated acceleration rate at which an upstream component intends to stream the multimedia and an acceleration interval for which the upstream component intends to maintain the estimated acceleration rate.

11. A method as recited in claim 10, further comprising prior to the act of beginning, determining, at least in part from the advisory data, an estimated buffer duration prior to beginning to present the multimedia for the acceleration rates of the data array.

12. A method as recited in claim 8, wherein said act of receiving comprises receiving advisory data comprising a start-up profile relating to multiple acceleration rates and wherein said calculating comprises interpolating the measured rate between a first of the multiple acceleration rates having a higher value than the measured rate and a second of the multiple acceleration rates having a lower value than the measured rate and selecting the measured duration to satisfy both of the first and second acceleration rates.

13. A method as recited in claim 8, wherein said calculating comprises calculating a first measured duration and prior to reaching the first measured duration ascertaining a second subsequent measured rate and calculating a second measured duration, and wherein said initiating is based on said second measured duration.

14. A computing device configured to implement a method as recited in claim 8.

15. A computer implemented method having instructions stored on a computer-readable medium and executable by a processor comprising:
 receiving advisory data relating to a multimedia stream from an upstream component, wherein the advisory data comprises a start-up profile with an amount of buffer recommended at one or more points in a presentation of the multimedia stream to avoid an underflow, wherein the up-stream component calculates the amount of buffer recommended based at least on the start-up profile, wherein the multimedia stream comprises a multimedia;
 determining a duration to buffer the multimedia stream on a downstream component before beginning to present the multimedia;
 subsequent to beginning to receive the multimedia stream, but prior to beginning to present the multimedia, verifying the duration, wherein the downstream component buffers the multimedia stream according to an amount of buffer recommended by the upstream component, while adjusting the amount of buffer as it determines and verifies the duration to buffer, wherein the verifying comprises measuring a rate (measured rate) at which the multimedia is being received; and
 subsequent to beginning to present the multimedia, recalculating the duration after the presentation is initiated by utilizing at least a measure of data already buffered and the start-up profile.

16. A method as recited in claim 15, wherein the act of verifying further comprises comparing the measured rate to an estimated rate that the multimedia would be received.

17. A method as recited in claim 15, wherein the acts of determining and verifying are achieved by a single component.

18. A system comprising:
 a sending unit configured to transmit multimedia, wherein the sending unit calculates an amount of buffer recommended based on a start-up profile; and,
 a receiving unit configured to receive the multimedia and advisory data relating to the multimedia, and to present the multimedia to a user, wherein the advisory data comprises the start-up profile, wherein the receiving unit is further configured to ascertain a measured rate at which the receiving unit is receiving the multimedia and to calculate a measured duration, based at least in part on the measured rate, to determine how long it should buffer the multimedia before starting to present the multimedia, wherein the receiving unit begins to buffer the multimedia according to the amount of buffer recommended while adjusting a buffer duration as it ascertains and verifies the measured rate;
 the receiving unit configured to recalculate the measured duration after/starting to present the multimedia by utilizing at least a measure of data already buffered and the start-up profile.

19. A system as recited in claim 18, wherein the sending unit comprises a server.

20. A system as recited in claim 18, wherein the sending unit is configured to access encoded multimedia and to transmit the encoded multimedia to the receiving unit.

21. A system as recited in claim 18, wherein the sending unit is configured to encode the multimedia prior to transmitting the encoded multimedia to the receiving unit.

22. A system as recited in claim 18, wherein the sending unit is configured to access the multimedia from a live encoding session.

23. A system as recited in claim 18, wherein the sending unit is configured to access the multimedia from a file.

24. A system as recited in claim 18, wherein the receiving unit comprises a personal computer.

25. A system as recited in claim 18, wherein the receiving unit comprises a set-top box.

26. A system as recited in claim 18, wherein the receiving unit comprises a cell phone.

27. A system as recited in claim 18, wherein the receiving unit is configured to decode the multimedia received from the sending unit.

28. A system as recited in claim 18, wherein the sending unit is further configured to send information regarding buffer values associated with presentation of the multimedia.

29. A system as recited in claim 18, wherein the sending unit is further configured to access header information associated with a presentation of the multimedia contained in a file and to send a summary of the information to the receiving unit.

30. A system as recited in claim 29, wherein the summary comprises at least one data array comprising at least one acceleration rate and a summarized buffer value associated with the presentation of the multimedia.

31. A system as recited in claim 29, wherein the summary comprises at least one data array comprising one or more of an acceleration rate, an associated buffer value associated with the presentation of the multimedia, or a time in the presentation associated with the buffer value.

32. A system as recited in claim 18, wherein the sending unit is further configured to send an estimated acceleration rate at which it intends to transmit the multimedia and a duration which it plans to transmit at the estimated acceleration rate.

33. A system as recited in claim 18 further comprising a transmission means coupling the sending unit and the receiving unit and wherein the transmission means may cause a transmission rate from the sending unit to be greater than the measured rate at the receiving unit.

34. A system comprising:
 a downstream component configured to receive and buffer a multimedia stream and to receive a start-up profile, and after buffering an amount of units of the multimedia to begin a presentation of the multimedia for a user; and,
 an upstream component configured to access the multimedia and stream the multimedia to the downstream component, and wherein the upstream component is further configured to obtain at least one start-up profile relating to the multimedia having a recommended amount of buffer at one or more points in the presentation of the multimedia to mitigate an underflow condition;

wherein the downstream component begins to buffer the multimedia according to the recommended amount of buffer while adjusting the buffer amount as it determines a duration to buffer based at least in part on a measurement of a rate at which the multimedia stream is being received at the downstream component and the at least one start-up profile received from the upstream component;

wherein the downstream component ascertains a measured rate and calculates a measured duration based at least on the measured rate and the start-up profile.

35. A system as recited in claim 34, wherein the at least one start-up profile comprises multiple start-up profiles which relate to potential streaming rates of the multimedia stream.

36. A system as recited in claim 34, wherein the upstream component compiles the at least one start-up profile.

37. A system as recited in claim 34, wherein the upstream component calculates an estimated buffer time to buffer the amount of units, based at least in part on the at least one start-up profile.

38. A system as recited in claim 34, wherein the upstream component calculates an estimated buffer time to buffer the amount of units, based at least in part on the at least one start-up profile and wherein the upstream component passes the estimated buffer time to the downstream component which buffers according to the estimated buffer time without further calculation or verification of the estimated buffer time.

39. A system as recited in claim 34, wherein the upstream component calculates an estimated buffer time to buffer the amount of units, based at least in part on the at least one start-up profile and wherein the upstream component passes the estimated buffer time to the downstream component which begins to buffer according to the estimated buffer time and prior to beginning the presentation the downstream component verifies the estimated buffer time.

40. A system as recited in claim 34, wherein the downstream component calculates an estimated buffer time to buffer the amount of units based at least in part on the at least one start-up profile.

41. A system as recited in claim 40, wherein the downstream component is configured to verify the estimated buffer time by calculating a second buffer time to buffer the amount of units based at least in part on a measured rate at which the downstream component is receiving the multimedia stream.

42. A system as recited in claim 41, wherein the downstream component is configured to delay beginning the presentation beyond the second buffer time due to properties of the multimedia stream.

43. A system as recited in claim 42, wherein the properties comprise one or more of send chunk size or audio/video separation.

* * * * *